United States Patent

[11] 3,588,143

| [72] | Inventor | Robert D. Heitert<br>c/o Mike Machine & Mfg. Co., 1619 N.<br>Hanley Road, St. Louis, Mo. 63130 |
|---|---|---|
| [21] | Appl. No. | 856,927 |
| [22] | Filed | Sept. 9, 1969 |
| [45] | Patented | June 28, 1971 |

[54] STABILIZER FOR AN AUTOMOBILE
13 Claims, 3 Drawing Figs.

[52] U.S. Cl. ...................................................... 280/150
[51] Int. Cl. ..................................................... B60r 27/00
[50] Field of Search ........................................... 280/150
(D); 293/692

[56] References Cited
UNITED STATES PATENTS
2,618,492 11/1952 Singer .......................... 280/150(D)
2,635,898 4/1953 Silverman.................... 280/150(D)
2,990,193 6/1961 Heard........................... 280/150(D)

*Primary Examiner*—Leo Friaglia
*Assistant Examiner*—Robert R. Song
*Attorney*—Cohn & Powell ABSTRACT: The stabilizing device includes an inertia block reciprocatively mounted by means of ball bearings within a housing which is rigidly attached to the vehicle to be stabilized. A preloaded compression spring extends between each end of the housing and the inertia block, and adjustable impact studs are located at each end of the housing a short distance from the inertia block in the rest position. The inertia block is relatively free to move against the compression springs, such movement being curtailed by impact of the block against one of the studs depending on the direction of change of movement of the vehicle.

INVENTOR
ROBERT D. HEITERT
BY
*Cohn and Powell*
ATTORNEYS

3,588,143

STABILIZER FOR AN AUTOMOBILE

BACKGROUND OF THE INVENTION

This invention relates in general to the stabilization of vehicles in motion and in particular, to the use of a movable weight to effectuate such stabilization.

When moving objects change their direction of motion, they are subjected to forces in accordance with well-known scientific laws. For example, when an automobile changes direction on rounding a curve in the road, centrifugal forces act on the vehicle which are related to the mass of the vehicle, its speed and the radius of the curve.

Most automobiles have a mass distribution which is centered toward the front wheels rather than the rear wheels and this fact, taken into consideration with the vertical weight distribution to the wheels, tends to spin the vehicle when its direction is abruptly changed. By placing a weight which can move independently of the general motion of the vehicle toward the rear of the vehicle, this spinning tendency can be counteracted to some extent resulting in much safer operation during turning.

Following this general principle, stabilizers exist in the art which include a weight, freely rather than fixedly, attached to the automobile. Such weights are intended to move against spring action depending on the direction of turn. This type of stabilizer is satisfactory only so long as the motion of the vehicle in which the stabilizer is mounted is not changed rapidly more than once before the moving weight has substantially attained a rest position. However in the operation of automobiles, fairly rapid changes in direction are frequently encountered particularly when passing, when the overtaking vehicle moves outwardly and inwardly in a very short period of time. In such a situation, if the movement of the stabilizing weight is slow acting, then it will augment the tendency of the automobile to spin, rather than counteract it. Clearly, this is a dangerous condition and is probably the reason why stabilizers in the prior art have apparently not met with general acceptance.

SUMMARY OF THE INVENTION

This stabilizer counteracts the tendency of a motor vehicle to spin or lean during turns. The action of the relatively freely moving weight utilized to effect this stabilization is rapid and of short duration, with the consequence that this stabilizer if effective during rapid directional changes of operative polarity. The stabilizer is suitable for use on virtually any type of vehicle including aircraft. It provides a stabilizing effect that significantly reduces or prevents sidesway, slipping and leaning.

The stabilizer includes an inertia block having opposed bearing engagement means. An abutment engagement means is spaced from each end of the inertia block, and a precompressed spring extends between each bearing engagement means and its associated abutment engagement means. Adjustable stop means is disposed adjacent the engagement means at each end of the inertia block for selective engagement with the block to limit movement of the block in either direction, and the block is mounted for movement between these stop means.

The stabilizer includes a housing having a pair of spaced end walls providing the abutment engagement means, and a base portion extending between the end walls. The base portion includes a bottom wall and a pair of opposing sidewalls. The inertia block includes a plurality of sockets adjacent each sidewall and bottom wall. Each socket receives a ball bearing which engages an associated sidewall or bottom wall, and the ball bearings provide the mounting means.

The stop means adjacent each end of the inertia block includes an adjustable bolt threadedly mounted to its associated end wall. Each bolt includes a remote end, spaced from the bearing race a predetermined distance in the rest position of the inertia block to create a gap therebetween, each gap being within the range of and including one-thousandth and one-half of one inch.

The weight of the inertia block is between one sixty-fifth and one-hundredth of the weight of the automobile.

The resilient means between the housing and inertia block are provided by compression springs precompressed in the rest position to a value within the range of and including one unit of weight and two units of weight for each unit of weight of the inertia block. Each spring is disposed about an associated, adjustable bolt.

DESCRIPTION OF THE PREFERRED EMBODIMENT

Figure 1:
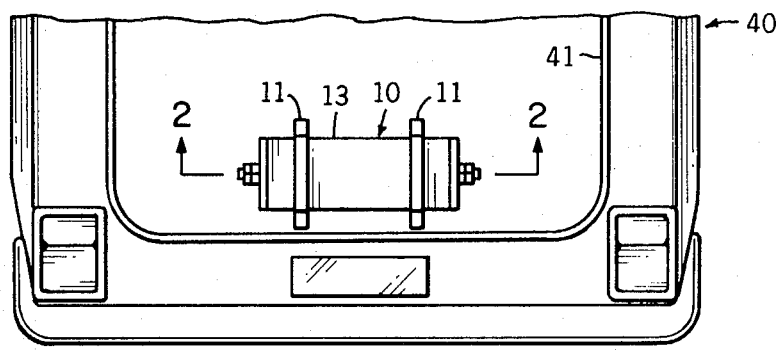
FIG. 1 is a fragmentary plan view of an automobile trunk illustrating the stabilizing device mounted therewithin.

Referring now by characters of reference to the drawing and first to FIG. 1, it will be understood that the stabilizing device 10 is intended to be mounted interiorly of a vehicle, such as an automobile, generally shown by numeral 40 by means of suitable attachment means such as a pair of U-shaped clamps 11. The device is preferably centered on the longitudinal axis of the vehicle in the trunk 41.

Figure 2:
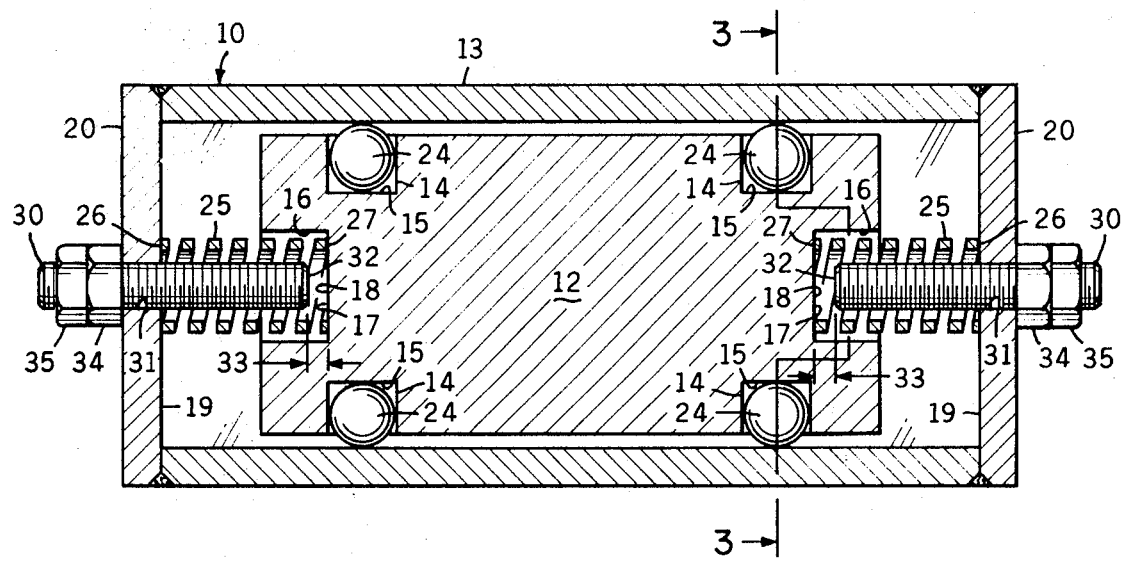
FIG. 2 is a longitudinal, elevational view through the device taken on line 2-2 of FIG. 1.
Figure 3:
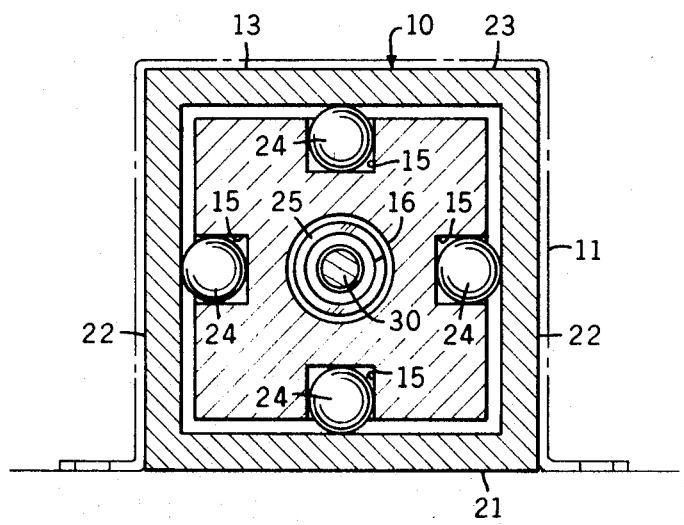
FIG. 3 is a cross-sectional view taken on line 3-3 of FIG. 2.

FIGS. 2 and 3 illustrate the device 10 in enlarged detail, and it will be observed that it includes an inertia block 12 reciprocatively mounted within a housing 13, the housing 13 constituting a support means. In the preferred embodiment, the inertia block 12 is formed from an elongate casting having a substantially square cross section, and the encasing housing 13 is formed from welded plates.

The hollow housing 13 within which the inertia block 12 is reciprocatively mounted, is of a square section having a compatible configuration with that of the inertia block 12. The inertia block 12 is substantially centered within the housing 13 and is provided with a plurality of laterally disposed socket portions 14, each of which includes an end bearing face 15. Each end of the inertia block 12 includes a longitudinally disposed socket 16 providing a bearing portion 17 constituting a first engagement means.

Turning now to the construction of the housing 13, this member 13 includes opposed ends 20 providing abutment portions constituting second engagement means and base means, extending between said ends 20. The base means includes a bottom wall 21, opposed sidewalls 22 and an upper wall 23. In the context of this description, all of the walls are included in the base means for the reason that, in the preferred embodiment, the inertia block 12 is or can be supported by each of the four walls.

The inertia block 12 is reciprocatively mounted within the housing 13 by means of a plurality of ball bearings 24 constituting roller means. Each ball bearing 24 is housed within an associated socket 16 for rolling engagement on an adjacent wall. The provision of roller means on each side of the inertia block 12 results in a minimum of play between the inertia block 12 and the housing 13. Minimizing the play in this way is a distinct advantage because the random motion of the vehicle lateral to the axis of the device would otherwise tend to jostle the inertia block 12 within the housing 13. To provide a relatively close lateral tolerance between the inertia block 12 and the sides of the housing 13, the diameter of each ball 24 is substantially equal to the depth of its associated socket plus the desired gap between the inertia block and the housing.

Extending between each end wall 20 of the housing 13 and the bearing portion 17 of the associated socket 16 is a compression spring 25. Each of the springs 25 is preloaded against the bearing faces provided respectively by the bottom portion 17 of each socket 16, and the inner face 19 of each end wall 20. It will be understood that the springs 25 being similarly loaded tend to center the inertia block 12 within the housing 13 in the rest position of the inertia block 12. It will be understood that a tension spring could be substituted by each compression spring. Such a substitution would merely involve attaching the tension spring in extended relation between the engagement means on the inertia block 12 and the engagement means on the housing 13, of an equivalent structure.

A stud 30 constituting a stop means, is threadedly received within an aperture 31 provided in each end wall 20. Each of the studs 30 is adjustable by virtue of this arrangement, and each stud 30 includes a remote face 32 adjacently spaced relative to the inner bearing face 18 of the bearing portion 17 whereby to provide a variable gap generally shown by numeral 33. Lock nuts 34 and 35 ensure that the gap 33 is maintained at a desired setting. This setting is such that when the automobile experiences a change in direction of sufficient magnitude, the inertia block 12 will move under the action of centrifugal forces, for example, until is is precluded from further movement by impact with one or other of the faces 32 at the remote end of each adjustable stud 30.

It is thought that the structural features and functional advantages of this stabilizing device have become fully apparent from the foregoing description of parts, but for completeness of disclosure, the installation and operation of the device will be briefly described.

As clearly indicated in FIG. 1, the stabilizer housing 13 is secured to the automobile, for example, within the trunk 41, as by clamps 11. In this way, the housing 13 becomes essentially part of the automobile 40. The inertia block 12, however, is substantially independent of the automobile 40 in that it is capable of independent movement relative to the housing 13 against the preloaded compression springs 25, when the automobile changes direction.

The weight of the inertia block 12 should be between one sixty-fifth and one-hundredth of the weight of the automobile, taking into consideration the effect of passenger weight. Thus for an automobile of some 4,000 pounds, an inertia block having a weight of 50 pounds, which represents one-eightieth of the automobile weight has been found to be satisfactory. Because of the precompression induced into each of the springs 25, the net resistance of these springs 25 must be overcome before the weight can move a distance equivalent to the gap 33. This gap 33 is between one-thousandth inches and one-half of one inch, the specific amount being determined empirically as a practical matter, depending on the type of vehicle, the location of the stabilizer and the sharpness of turn which the vehicle is likely to encounter. The preloading of the compression spring should be between 1 and 2 pounds of compression of each pound of weight of the inertia block.

The utilization of ball bearings 24 for the roller means by which the inertia block 12 is mounted within the housing 13 ensures that the movement of the inertia block 12 laterally of the vehicle 40 and in the direction of its own longitudinal axis will be smooth until such time as the block strikes one of the studs 30. The considerable amount of precompression in the spring 25 ensures that the inertia block 12 will tend to return rapidly to its rest position and that the cycle of movement is of short duration.

It will be observed that in the preferred embodiment, the bearing portion 17 includes a center portion providing a bearing face 18 for the stud 30. The arrangement of parts in the preferred embodiment provides that each spring 25 is disposed about an associated stud 30, and this feature is considerably advantageous in that there is thereby provided an automatic alignment between the springs at either end of the housing 13 and the mass of the movable inertia block 12.

I claim as my invention:

I claim:
1. A stabilizer for an automobile, comprising:
   a. an inertia block including opposed first engagement means,
   b. a pair of second engagement means each disposed in adjacent spaced relation from an associated first engagement means,
   c. resilient means extending between each first engagement means and its associated second engagement means,
   d. stop means each mounted on said second engagement means with the free end thereof disposed in closely adjacent spaced relation from an associated first engagement means for selective engagement therewith, and
   e. mounting means mounting the inertia block for movement between the stop means.
2. A stabilizer as defined in claim 1, in which:
   f. at least one of the stop means is adjustable to provide a variable gap between said stop means and its associated first engagement means.
3. A stabilizer as defined in claim 1, in which:
   f. each resilient means includes a compression spring, each spring being preloaded a substantially equal amount to substantially center the inertia block between the stop means in the rest position.
4. A stabilizer as defined in claim 1, in which:
   f. support means is adapted to be mounted to the automobile, and
   g. the mounting means includes roller means disposed between the inertia block and the support means.
5. A stabilizer for an automobile, comprising:
   a. a housing adapted to be mounted to an automobile, the housing including:
      1. a pair of spaced end walls having abutment portions, and
      2. a base portion extending between the end walls,
   b. an inertia block including opposed bearing portions, the block being mounted for reciprocative movement within the housing,
   c. a pair of springs, each extending between an abutment portion and an associated bearing portion,
   d. stop means mounted on each end wall with the free end thereof disposed in closely adjacent spaced relation from an associated bearing portions, and
   e. mounting means mounting the inertia block for movement between the stop means, the mounting means extending between the inertia block and the base portion.
6. A stabilizer as defined in claim 5, in which:
   f. each bearing portion includes a bearing face, and
   g. each stop means includes an adjustable bolt threadedly mounted to its associated end wall, the bolt having a remote end selectively spaced from the bearing face in the rest position of the inertia block to create a gap therebetween
7. A stabilizer as defined in claim 6, in which:
   h. each gap is within the range of and including one-thousandth of one inch to one-half of one inch.
8. A stabilizer as defined in claim 5, in which:
   f. the weight of the inertia block is within the range of and including one sixty-fifth and one-hundredth of the weight of the automobile.
9. A stabilizer as defined in claim 5, in which:
   f. each spring is precompressed in the rest position to a value within the range of and including one unit of weight and two units of weight for each unit of weight of the inertia block.
10. A stabilizer as defined in claim 5, in which:
    f. the base portion of the housing includes a bottom wall and a pair of adjacent sidewalls, and
    g. the mounting means includes roller means disposed between the inertia block and the bottom wall and the inertia block and the sidewalls.
11. A stabilizer as defined in claim 10, in which:
    h. the inertia block includes a plurality of sockets adjacent the bottom wall, and
    i. the roller means includes a plurality of ball bearings, each ball being partially received in an associated socket for rolling engagement with the bottom wall.
12. A stabilizer as defined in claim 10, in which:
    h. the inertia block includes:
       2. a plurality of sockets adjacent each sidewall, and
       2. a plurality of sockets adjacent the bottom wall, and i. the roller means includes a plurality of ball bearings, each ball being received in an associated socket for rolling engagement with an associated wall.

13. A stabilizer as defined in claim 12, in which:

j. the inertia block includes a socket at each end having a bottom face providing the bearing portion, and k. each compression spring is disposed about an adjustable bolt and received within said socket to bear against the associated bottom face.